United States Patent [19]

Watkins

[11] 3,811,217
[45] May 21, 1974

[54] FISH HOOK RELEASING DEVICE
[76] Inventor: Bernard Watkins, P.O. Box 223 Culver Lake, Branchville, N.J. 07826
[22] Filed: May 21, 1973
[21] Appl. No.: 362,460

[52] U.S. Cl.................. 43/44.82, 43/43.4, 43/53.5
[51] Int. Cl............................................ A01k 83/00
[58] Field of Search............. 43/43.16, 42.4, 42.42, 43/43.4, 53.5, 43.2, 44.82

[56] References Cited
UNITED STATES PATENTS

| 954,352 | 4/1910 | Sjolander | 43/44.82 |
|---|---|---|---|
| 3,002,311 | 10/1961 | Kyper | 43/42.42 X |
| 2,792,664 | 5/1957 | Schwarzer | 43/43.16 |
| 3,670,446 | 6/1972 | Wheeler | 43/43.4 X |
| 2,492,064 | 12/1949 | Rauh | 43/43.2 X |
| 2,862,327 | 12/1958 | Steinhouser | 43/53.5 |

Primary Examiner—Antonio F. Guida
Assistant Examiner—Daniel J. Leach
Attorney, Agent, or Firm—Bauer & Amer

[57] ABSTRACT

An improved fish hook, devoid of any barbs or barb-like structure, the absence of which greatly facilitates both the hooking and disengaging of any hooked fish therefrom is pivotally mounted to an elongated body. Cooperating therewith and mounted to extend from the body is a spur, the pointed end of which is taken into the fish's mouth along with the hook during the hooking of a fish. The free end of the spur extends beyond the hook point in facing relation thereto and both hook and spur engage the fish internally and prevent its inadvertent release from the hook and also from swallowing the hook down into its stomach. The shallow depth of intake contributes to the facilitated release of the hooked fish. A tong-type implement is used with the device to withdraw the hook from its engagement with the hooked fish.

5 Claims, 5 Drawing Figures

PATENTED MAY 21 1974　　　　　　　　　　　　　　　　　　3,811,217

FISH HOOK RELEASING DEVICE

The present invention relates generally to an improved fish hook, and more specifically to improvements for a fish hook which do not detract from its fish-hooking function, but which nevertheless permit any hooked fish to be readily disengaged therefrom with little or no handling.

Considerable effort has been expended to embody in a fish hook structural features which minimize the inconvenience and difficulty of subsequently unhooking the fish. Exemplifying these prior art efforts in U.S. Pat. No. 2,815,603, and other such patents. While "quick release" of the caught or hooked fish, or an equivalent capability, is achieved by the use of one or more prior art fishing hooks, this end result is invariably made possible by the embodiment of structural features which greatly complicate the construction and use of the fish hook. Not only are these complications undesirable, since they increase the cost to the user, but in many instances a structurally complex hook is not as effective in its fishing performance.

Broadly, it is an object of the present invention to provide an improved fishing hook characterized by its simplicity in both construction and performance, and in these and other respects thereby overcoming the foregoing and other shortcomings of the prior art. Specifically, it is an object to provide a fishing hook having no structure thereon which complicates its removal, and yet is readily capable, during use, of maintaining captive control over any fish caught thereon.

A fish-hooking and release device demonstrating objects and advantages of the present invention includes a plain, barbless fishing hook which, in an obvious manner, is readily removed or disengaged from any hooked or caught fish. Cooperating with this hook is a flexible, spur-like element, which does not interfere with the hooking of the fish, but which thereafter establishes by internal engagement with the fish an optimum shallow depth to which the hook is taken in and also minimizes the possibility of inadvertent disengagement of the fish from the hook.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
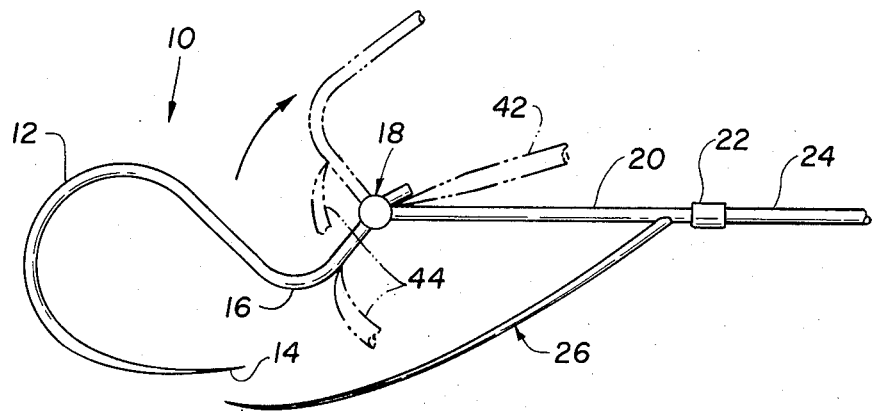
FIG. 1 is a side elevational view of the fish-hooking device in which positions of movement of the pivotally mounted hook thereof is shown in full line and phantom line perspective.

Reference is now made to the drawings wherein there is shown a fish-hooking device, generally designated 10, which demonstrates objects and advantages of the present invention. Among other noteworthy features, device 10 is as effective as any fishing hook now known insofar as catching fish is concerned, and yet said hooked fish is readily disengaged therefrom without the usual inconvenience that is occasioned by this chore. To this end, device 10 includes a fish-engaging hook 12 of conventional semi-circular configuration, but as clearly illustrated in the drawings, completely devoid of any barb-like structure that usually exists on the hook 12, as at the point 14. Because of the absence of any barbs or similar-type structure, hook 12 is easily manipulated out of its engagement with a hooked fish; yet, for reasons which will be described, even though hook 12 does not have any barbs, it is not readily possible for a hooked fish during its struggling or fighting movements to achieve release or cause its own disengagement from the hook.

Figure 2:
FIG. 2 is a plan view of the device showing further structural details.
Figure 2:
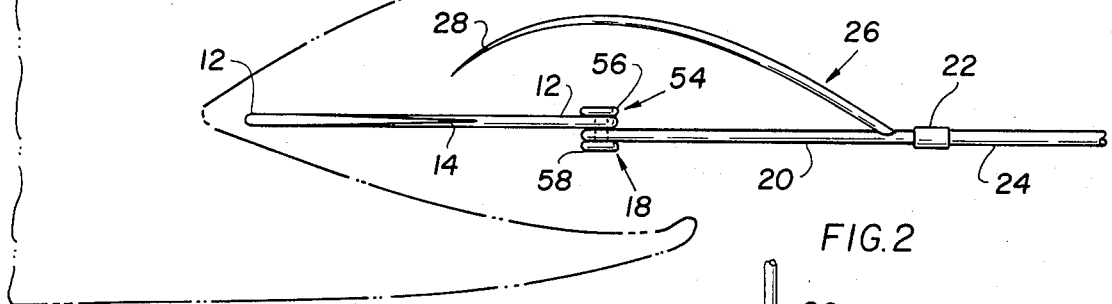

Hook 12 has a reverse curvature, as at 16, the significance of which will soon be apparent, and terminates in an end which is pivotally connected at 18 to an elongated body 20. At the opposite end of the body 20, as at 22, use is advantageously made of a gripping member or the like to contemplate a connection to a supply length 24 of the fishing line. Mounted to extend from the body 20 is a flexible spur 26, the free end 28 of which is located in a lateral clearance position adjacent the hook. Spur 26 is bowed slightly, as best illustrated in FIG. 2 and extends facing in length beyond the hook point 14 in a direction opposite the hook 12. This enables both the tip 28 andp point 14 to be taken simultaneously into the mouth of the fish.

Figure 3:
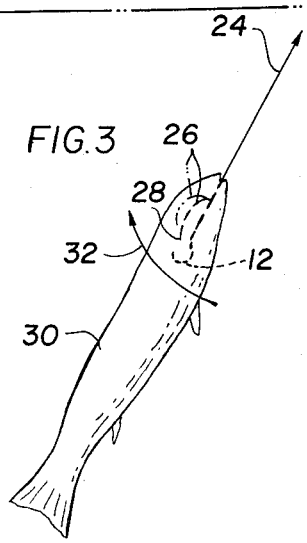
FIG. 3 illustrates how a hooked fish is prevented from releasing itself from the device hereof.

It will be understood that spur 26, by virtue of its springy material of construction as well as its progressively diminishing cross sectional area, exhibits a degree of flexibility which results in the tip 28 being easily brushed past when a fish 30 impales itself on the fish hook 12. Thus, as illustrated in FIGS. 2, 3, both the fish hook 12 and spur 26 are taken internally by the fish 30, and each thereafter functions as follows: Hook 12 engages the fish such that pulling in on the line 24 leads to its capture, all as is generally understood. Spur 26 and, more particularly point 28 thereon, will engage the fish from the opposite direction thereby limiting the depth to which the fish can take in hook 12. Also, another significant aspect of said opposite directions of engagement into the fish 30 of said hook 12 and spur 26 is that when the fish 30 struggles to free itself, which would require movement in the unhooking direction 32 relative to the curvature of the hook 12, this is effectively resisted by a bowing or an increase in the curvature of the spur 26, all as may be appreciated by comparison of the full line and phantom line illustrations of spur 26 as set forth in FIG. 3. This increase in curvature in the spur 26, in response to fish movement 32, produces a force urgency in the spur which effectively resists movement in the direction 32. This force resistance is similar to the resistance that results during the loading of a spring when the same is forced from its at-rest configuration into a configuration which causes stresses internally of the material out of which the spring is constructed.

Thus, in the manner described, although hook 12 is devoid of any barb-like structure, the function that is usually performed by this structure is provided by the spur 26. Unlike a hook barb, however, said spur is very easily removed from its engaged position with the fish 30 preparatory to a facilitated man-manipulated procedure during which fish 30 is unhooked from hook 12. From the foregoing, it should be noted that because the force resistance is built up by the bowing of the spur 26, in its initial starting position, as illustrated, for example, in full line perspective in FIG. 3, the spur 26, both in its diameter size and construction material, can be designed consistent with the requirement that it readily bend out of its initial starting position. It is for this reason that spur 26 is readily brushed past or over during the time that the fish takes said spur with the hook 12, but subsequently it can exert sufficient force and influence to effectively prevent inadvertent release of a hooked fish 30.

Figure 4:
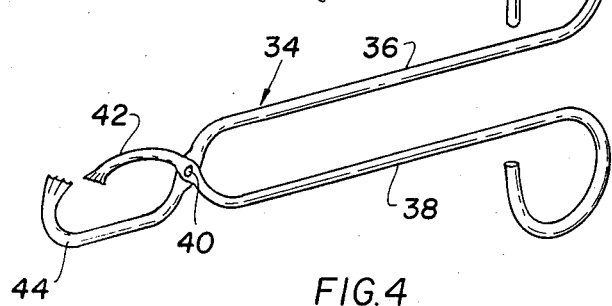
FIG. 4 is a perspective view of an implement to facilitate release of a hooked fish from the device.

Advantageously used with the fish-hooking device 10 is a tong-type implement 34 in the preferred form as illustrated in FIG. 4. Implement 34 is a two-part construction, each being a finger grip 36 and 38 pivotally connected, as at 40, and terminating in hook engaging legs 42 and 44. As illustrated in FIG. 1, the short leg 42 is projected within a seat formed at the pivot 18, while the long leg 44 is adapted to engage the hook 12, approximately at the curvature 16, so that in response to closing movement of the grips 36 and 38, there is corresponding closing movement of the legs 42 and 44 which causes pivotal movement of the hook 12 about the pivot 18. This pivotal movement of the hook 12 is in an appropriate clockwise direction which progressively withdraws the hook 12 from its engagement with the hooked fish. This withdrawal is aided by the lever force inherent in tong-type implement 34.

Figure 5:
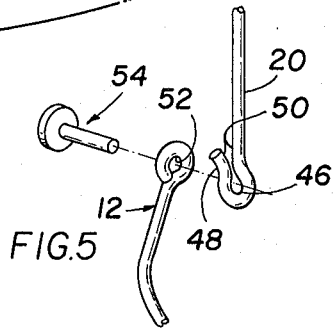
FIG. 5 is an exploded perspective view illustrating the pivotal connection of the hook and of the formation of a seat which facilitates using the FIG. 4 implement.

FIG. 5 illustrates a preferred construction for the pivot 18. More particularly, body 20 advantageously terminates in a circular configuration bounding an opening 46 and which also provides an angular extension 48 which cooperates with body 20 to bound a generally triangular opening 50 which effectively serves as a seat for the end of the short leg 42 of tong 34. Hook 12 also is formed into a configuration providing an opening 52 which, in practice, is aligned with the opening 46 and accommodates therethrough a shank of a rivet 54 or other fastening device. As illustrated in FIG. 2, the pivotal connection at 18 is completed by confining hook 12 and body 20 between the rivet head 56 and the head 58 subsequently shaped or formed out of the mass at the remote end of the rivet shank or body.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A fish-hooking and release device comprising a body attachable at one end to a supply length of a fishing line, a fish-engaging hook devoid of any barb-like structure pivotally connected on said other body end, and a flexible spur mounted to extend from said body and spaced from said hook with its free end extending beyond the point of the hook to be taken internally by a fish and in facing relation to said hook, said spur being internally engaged in a hooked fish minimizes an inadvertent release thereof and also limits the taking in of said hook to a shallow depth consistent with facilitated man-manipulated release thereof.

2. A fish-hooking device as defined in claim 1 wherein said flexible spur is bowed in a direction such that the curvature thereof is adapted to increase when necessary to produce a corresponding increase in the force exerted by said spur which contributes to said minimizing inadvertent release from said hook.

3. A fish-hooking device as defined in claim 2 wherein the free end of said flexible spur is in a clearance position laterally of the plane of said hook.

4. The combination with said fish-hooking device as defined in claim 3 of a tong-type implement for urging said hook through pivotal movement relative to said body incident to contributing to said man-manipulated release from said hook.

5. The combination as defined in claim 4 including a projection on said body defining a seat for accommodating a leg of said tong-type implement during said use thereof to achieve said man-manipulated release.

* * * * *